Dec. 4, 1934.                G. E. SWARTZ                1,982,886
                      DRIVING LOCKING RELEASING MEANS
                           Filed Nov. 25, 1931
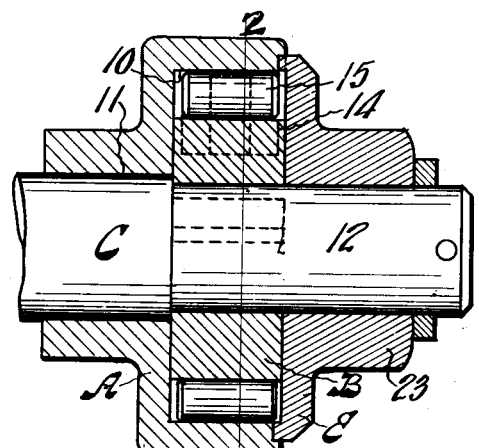
Fig. 1
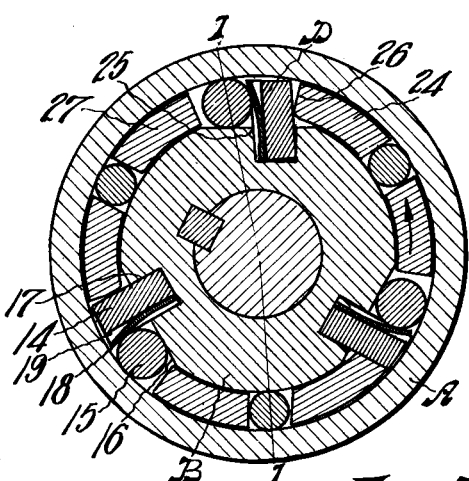
Fig. 2
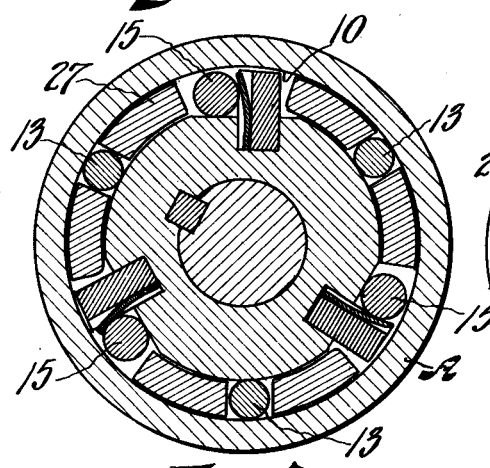
Fig. 3
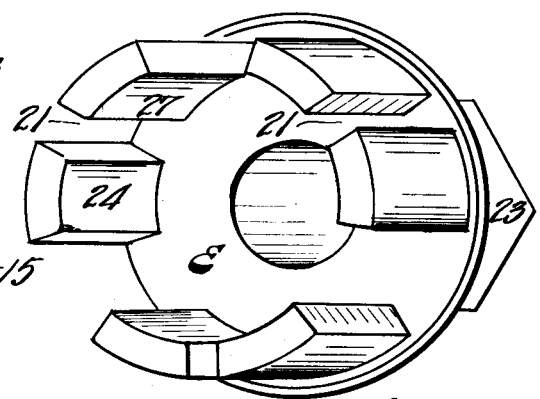
Fig. 4
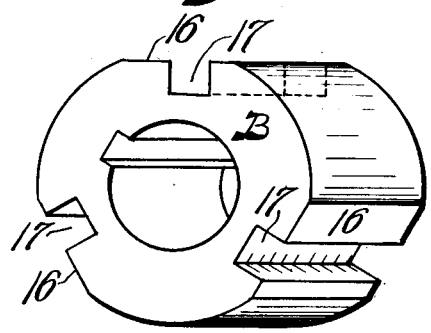
Fig. 6
Fig. 5
INVENTOR
G. E. Swartz
By C. F. Heinkel,
ATTORNEY Patented Dec. 4, 1934

1,982,886

UNITED STATES PATENT OFFICE 1,982,886

DRIVING-LOCKING-RELEASING MEANS

Guy E. Swartz, Detroit, Mich.

Application November 25, 1931, Serial No. 577,289

12 Claims. (Cl. 192—8)

My invention relates to means or mechanisms for driving a mechanism to a certain position, then locking in that position and then releasing the mechanism.

My object is to provide a means which is economical of manufacture, easy of operation and of release, efficient in locking, and efficient in retaining a locking condition until it is willfully released.

I attain this object by the mechanism illustratively shown in the accompanying drawing and specifically described in this specification.

In the accompanying drawing, mentioned above, forming a part of this specification:

Fig. 1 is a section taken on the line 1—1 of Fig. 2 showing arrangement of parts embodying my invention.

Fig. 2 is a section taken on the line 2—2 of Fig. 1 showing the mechanism in locking position.

Fig. 3 is a section similar to Fig. 2 showing the locking mechanism in unlocking position.

Fig. 4 is a perspective view of the driving member.

Fig. 5 is a perspective view of the block with the spring thereon.

Fig. 6 is a perspective view of the driven member.

Similar reference characters refer to similar parts throughout the views.

In the prior art, the mechanisms used are too expensive and do not retain a mechanism in a locking position in jigs. For instance, it is necessary that the clamping plate thereof be moved or driven to a position wherein the work to be operated upon is clamped in the jig. Operations are then performed on the work while it is so held in the jig. The clamping must hold the work while it is being operated upon. Locking means are usually provided to prevent the clamping mechanism from becoming loose but the locking mechanisms so provided are too expensive and do not hold the mechanism in the precise position it was moved into and permits the clamping plate to release and thereby also release the work and consequently are practically useless.

In my invention, the mechanism is locked after the work is clamped into position and the locking is effected after the clamping is completed and is retained while the work is being operated upon and is released at will to release the work.

The device shown in the accompanying drawing comprises the casing A, the driven member B, the shaft C, the locking mechanism D and the driving member E.

The casing A is stationary and has the bore 10 therein and also has the journal bore 11, concentric with the bore 10, to journal the shaft C therein. The front end of the casing is open.

The driven member B is located in the bore 10 and is keyed onto the part 12 of the shaft C to rotate therewith.

The member B is made smaller in diameter than the bore 10 for the introduction of the anti-friction rollers 13 between the same to centralize the member B in the bore 10 and to take all sidewise pressure off of the journal 11. The rollers 13, three in number in this instance, are equi-distantly spaced, fit closely in between the circular wall of the casing and the outside of the member B, and are held in position by the prongs on the driving member, described below. This structure centralizes the member B in the casing.

The shaft C is journaled in the bearing 11 of the casing, has the part 12 extending through the casing and terminates at one end in the journal end for the driving member E and, at the other end, in a suitable means to operate some mechanism as the clamping plate of a jig for instance.

The locking mechanism D comprises the blocks 14 bearing against the locking members 15, three rollers in this instance, which are loosely mounted between the circular wall of the bore 10 and the flat faces 16 of the member B.

The blocks 14 are individual members and, preferably, are partly seated in the grooves 17 in such a manner that the same can move individually to some extent in a direction of movement for driving. The springs 18 are located in the slots 19 of the blocks and have the ends 20 thereof projecting beyond one side thereof to contact the locking members 15 and normally tend to hold the same in a locking position against the inner circular wall of the bore 10 and the flat faces 16.

The driving member E is journaled on the shaft end 12 and has a part extending into the space between the inner circular wall of the bore 10 and the outer wall of the member B. The slots 21 are just sufficiently wide to clear the anti-friction rollers 13 and the slots 22 are sufficiently wide to clear the locking members and the blocks.

The operation of the mechanism described is as follows:

The shaft C is to be rotated to operate some mechanism, is then to be locked to prevent reverse rotation thereof and is then to be released for rotation thereof in either direction.

As is seen in Fig. 3, the locking mechanism is entirely released so that the shaft can be rotated in either direction by rotating the driving member by means of the polygonal part 23 thereon.

Upon such rotation in the direction of the arrow on the prong, the prongs 24 contact the blocks 14 and thereby transmit the motion onto the walls 25 of the grooves 17 and thereby rotates the member B and the shaft thereon to any desired position.

Attention is directed to the walls 26 of the prongs 24 being made radial of the device so that only the innermost part thereof contacts the block. This structure transmits part of the driving motion onto the locking rollers but the major portion thereof is transmitted onto the driven member B for rotation thereof.

This rotation of the member B continues until some resistance is offered to the rotation thereof, as when work is being clamped in a device and the clamp contacts the work, whereupon the member B stops rotating. Now, a further rotative movement of the driving member tilts the blocks in the grooves thereof and moves the rollers into a wedging position and locks the mechanism against reverse rotation.

Upon a movement of the driving member, reverse of the former movement, the prongs 27 first contact the locking rollers and release the same from the locked condition thereof so that the mechanism can be rotated in either direction.

My locking structure positively locks after work has been clamped and is released before an unclamping movement can be started and this locking and releasing is being done without affecting the locked article.

The device as a whole has the fewest possible number of parts and these parts are made so that the assembly thereof is easily and conveniently attained and results in a highly efficient device.

As mentioned above, I do not limit myself to the precise application of my invention as shown and described; neither do I limit myself to the precise structure and arrangement of the parts as shown and described; therefore, without limiting myself to the precise application of my invention as shown and described nor to the precise structure and arrangement of parts as shown and described except whatever limitations are imposed by the appended claims.

I claim:

1. In a locking mechanism, a casing, a driven member in said casing, a block inserted into said driven member, a driving member to engage said driven member to rotate the same for a driving movement thereof, and a roller adapted to be wedged to lock said mechanism against reverse rotation upon completion of a driving movement thereof and to be released upon a rotative movement of said driving member in the opposite direction.

2. In a driving mechanism, a casing, a driven member in and rotatable relative to said casing, a part inserted into said driven member, and a driving member engaging said part to move the same for engagement thereof on said driven member to rotate the same and to subsequently lock the same against movement.

3. In a driving-locking mechanism, a casing, a driven member in and rotatable relative to said casing, a part inserted into said driven member, a driving member engaging said part to move said driven member, and a locking member circumferentially adjacent to said part to engage and lock said driven member against reverse movement relative to said casing.

4. In a driving-locking mechanism, a casing, a driven member in and rotatable relative to said casing, a block inserted into said driven member, a driving member having a part engaging said block to move said driven member, a locking member circumferentially adjacent to said block to engage and lock said driven member against reverse movement, and a part of said driving member engaging said locking member to release the lock.

5. In a driving-locking mechanism, a casing, a driven member in and rotatable relative to said casing, a driving member for said driven member for movement thereby, a locking member circumferentially adjacent to an individually movable part of said driven member to lock said mechanism against reverse movement after said driving member has moved said driven member to a definite position, and a spring between said part and said locking member.

6. In a locking mechanism, a casing, a driven member in and rotatable relative to said casing, a driving member adapted to contact an outer side of an individually movable part of said driven member to move the latter into a definite position and to lock said mechanisms upon a further movement of said driving member.

7. In a driving-locking-releasing mechanism, a casing, a driven member in said casing, a releasable driving and locking means between said casing and said driven member and adapted to contact on a projecting part of said driven member for rotation thereof, and an anti-friction means between said casing and said driven member forming part of said driving means.

8. In a driving-locking-releasing mechanism, a casing, a driven member in said casing, a releasable driving and locking means between said casing and said driven member, and a series of rollers to centralize said driven member in said casing and circumferentially adjacent to and adapted to contact on a projecting part of said driven member and forming a part of said driving means.

9. In a driving-locking-releasing mechanism, a casing, a driven member in said casing, a block in said driven member and projecting beyond the outer surface thereof, a spring on said block, a roller adjacent to said spring, and a driving mechanism to engage said block and said roller for rotation and locking of said driven member.

10. In a driving-locking-releasing mechanism, a casing, a driven member in said casing, a series of rollers to centralize said driven member in said casing, a locking mechanism in between said driven member and said casing, and a driving member having prongs extending into said casing to engage and to move said locking mechanism for locking and release thereof.

11. In a locking mechanism, a casing, a driven member in and rotatable relative to said casing and having a groove therein, a driving block in said groove and having one side thereof substantially on a radial axis of the mechanism.

12. In a driving-locking-releasing mechanism, a casing, a driven member in and rotatable relative to said casing and having a groove therein, a part in said groove and having one side thereof substantially on a radial axis of the mechanism, a locking member adjacent to said driven member, and a spring between said part and said locking member.

GUY E. SWARTZ.